United States Patent

[11] 3,608,875

[72] Inventor Ernst Kriegel
 Essen, Germany
[21] Appl. No. 775,768
[22] Filed Nov. 14, 1968
[45] Patented Sept. 28, 1971
[73] Assignee Fried Krupp Gesellschaft mit beschrankter
 Haftung
 Essen, Germany
[32] Priority Nov. 14, 1967
[33] Germany
[31] P 16 42 940.6

[54] VALVE TRAY FOR COLUMNS WITH MASS
 TRANSFER
 4 Claims, 7 Drawing Figs.
[52] U.S. Cl. .................................................... 261/114 A,
  261/114 VT
[51] Int. Cl. ..................................................... B01d 3/20
[50] Field of Search ........................................... 261/114,
  114 VT, 114.1

[56] References Cited
 UNITED STATES PATENTS
2,627,397 2/1953 Hendrix ....................... 261/114 VT
 FOREIGN PATENTS
884,837 3/1943 France ........................ 261/114.1
Primary Examiner—Tim R. Miles
Assistant Examiner—Steven H. Markowitz
Attorney—Walter Becker ABSTRACT: In combination with a valve tray for mass-transfer columns which has a great number of openings for the passage of vapor, a cover structure which comprises disc elements to close and open the openings and interconnected by links so as to form a chain of discs while the outer discs are attached by links to the tray is the object of the invention.

PATENTED SEP 28 1971

3,608,875

Inventor:
Ernst Kriegel

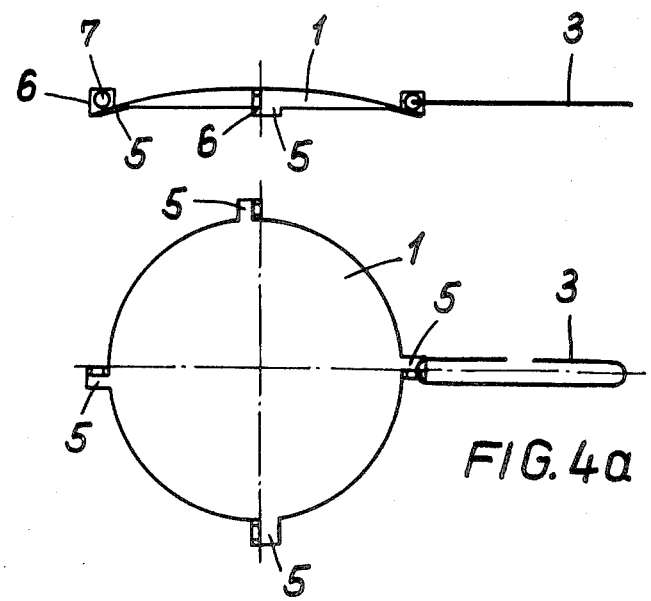
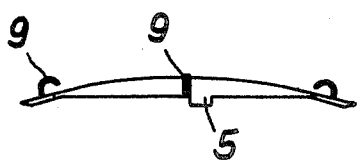

VALVE TRAY FOR COLUMNS WITH MASS TRANSFER

In columns for mass transfer, liquids and vapors are bought into intimate contact with one another on so-called trays. The liquid flows continuously over the tray, whereas the vapor enters the liquid from below through openings in the plate. The purpose of the various tray designs consists in assuring as fine a distribution and mixing of the vapors and the liquid as possible.

Various designs of columns and trays are known for carrying out mass-transfer operations. With the most important tray designs, there are either no closing devices at all for the tray perforations (sieve tray) or the openings have closures in the form of bubble caps (bubble tray) or valves (valve tray). Sieve trays, however, have only a rather limited working range, because the liquid will rain through the openings of the plate when the vapor throughout is too low. With bubble plates, a small quantity of liquid always stays on the tray due to the neck of the bubble cap. In view of the deflection of the vapor by the cap the pressure loss is, however, higher. Valve trays in contrast thereto have a more favorable working range and a lower pressure loss.

With the known valve trays, the valve discs are either movably connected to joints beside the tray openings or they move freely in the holes of the tray as far as a stop which limits the valve lift. Laterally linked valve discs, however, have the disadvantage that they initially open at one side and consequently form vapor channels with poor mixing and mass transfer. Furthermore, there exists the danger, that the valves may soil and stick or fatigue if spring elements are involved. Valves with stops limiting the lift, on the other hand, have to be inserted in the holes and removed again for cleaning individually. Under low load, these valves open and close irregularly, pumping liquid on to the lower tray and so reduce the mass transfer.

It is a further object of this invention to provide a valve tray for mass-transfer columns which will overcome the above mentioned disadvantages. These and other objects and advantages of the invention will appear more clearly from the following specification in connection with the accompanying drawings, in which.

FIGS. 4, 5 and 6 respectively illustrate different designs of the valve discs and the link connections; FIG. 4 shows an individual valve disc on a larger scale in side elevation and in top view (4a).

The valve tray for mass-transfer columns is, according to the present invention, characterized primarily in that the adjacent valve discs are connected by links to form a valve grid and the marginal discs are linked to the tray. The links are simple wire loops bent into the form of hairpins which are passed through the holes in the attachment lugs at the circumference of the discs.

The valve discs whose number, shape and arrangement may be largely independent of the perforation of the tray may be slightly concave and be serrated, corrugated or dihedral at the circumference.

The valve discs combined to form a valve grid may be installed and removed as a whole. With small trays a one-grid arrangement will suffice, whereas with larger trays the grid is advantageously subdivided into several sections. In addition to the improved exchangeability, the valve grid also leads to a more uniform opening and closing of the valves, so that the pumping of liquid on to the tray therebelow will be largely avoided. Also, a nonuniform flow of vapor will be less serious because when lifting individual valve discs, the adjacent valve discs will be lifted simultaneously also. Also, sticking valve discs will be opened by the adjacent opening discs. If the links have sufficient tolerance, also the danger of soiling is only low. Moreover, all valve discs are always in motion because the movement of each valve disc leads to a movement of the others so that the depositing of dirt is largely avoided.

In view of the tolerance in the joints, the valve will, in fully opened condition, be lifted completely from the tray and thus will leave the entire cross section of all the perforations open so that the tray will operate then like a sieve tray with the minimum flow and deflection losses. Fully opened the grid of valves forms a slight arch in the liquid by the stream of vapor. When the liquid level is not too high, the splashing of the liquid will thus be greatly reduced.

Figure 1:
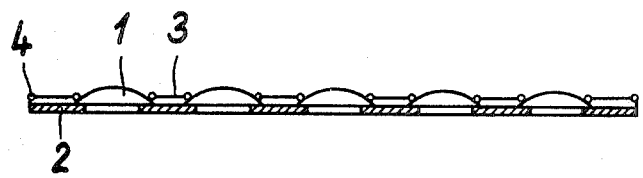
FIG. 1 illustrates a row of grid-valve tray.

Referring now to the drawings in detail, the valve discs 1 in Figure 1 are in closed condition and rest on the tray 2. The valve discs 1 are connected by links 3 and at the edge are attached to the tray 2 by joints 4.

Figure 2:
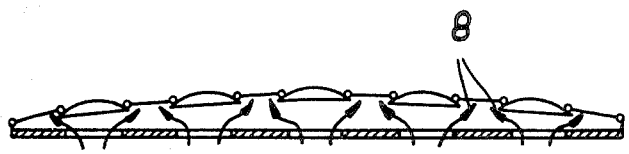
FIG. 2 shows the same row of valve discs as illustrated in FIG. 1, but in opened condition.

FIG. 2 shows the row of valve discs of FIG. 1 in the opened position. In view of the tolerance in the joints, the middle valves open slightly higher. The disturbance of the flow of vapor is only low as indicated by the arrows 8.

Figure 3:
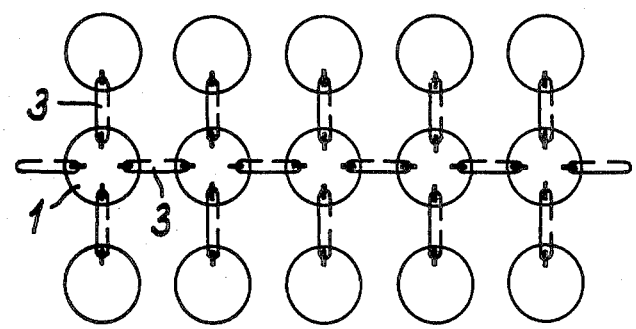
FIG. 3 is a top view of the row of valve discs, while the valve discs of the two adjacent rows are likewise indicated.

FIG. 3 shows the connection of several rows of valve discs.

FIG. 4 illustrates on a larger scale a valve disc in side view and top view respectively. As will be seen from FIG. 4 the valve disc 1 is only slightly concave and comprises four dogs 5 with attachment lugs 6 at the circumference of the disc. The slight curvature of the valve disc causes a better penetration of the vapor into the liquid and hence an increase in the mixing and mass-transfer effect. The dogs 5 prevent sticking and give free a minimum cross-sectional area of passage for the vapor. The vapor which passes through the slots between the dogs brings about a self-cleaning of the joints. Link elements preferably in the form of simple hairpins of bent-wire loops 3 are passed through the holes 7 of the discs and connected to form a grid.

FIGS. 5 and 6 respectively illustrate how the valve discs may also be connected with the links. The eyes 9 and 10 are either formed of a part of the distance dogs 5, as shown in FIG. 5, or they are welded or riveted thereto, as shown in FIG. 6. Corresponding eyes are also provided on the outer edge 4 (FIG. 1) of the tray to which the marginal valve discs are to be connected.

It is, of course, to be understood that the present invention is, by no means, limited to the particular showing in the drawing, but also comprises designs within the scope of the appended claims.

What I claim is:

1. In combination with a valve tray for mass-transfer columns which has a great number of openings for the passage of vapor, a cover structure which comprises: independent discs centrally located to close and open the openings and pivotally interconnected to each other by links so as to form a chain of discs readily interchangeable while the outer discs also are attached pivotally by other links to the tray.

2. A cover structure in combination according to claim 1, in which said discs are provided with eyelets at the circumference in that wire loops which are bent into the shape of a hairpin are passed through and serve as pivotal links.

3. A cover structure in combination according to claim 1, in which said independent discs are slightly concave in a direction centrally away from the tray.

4. A cover structure in combination according to claim 1, in which at least some of the discs have such a size as to simultaneously control opening and closing several openings.